Oct. 7, 1969  H. TAUBALD ET AL  3,471,125
DENTAL HANDPIECE WITH COMPRESSED-AIR TURBINE DRIVE
Filed April 7, 1966  4 Sheets-Sheet 1

INVENTORS
Helmut Taubald
Otto Fleer
BY *Flee & Flee*
ATTYS.

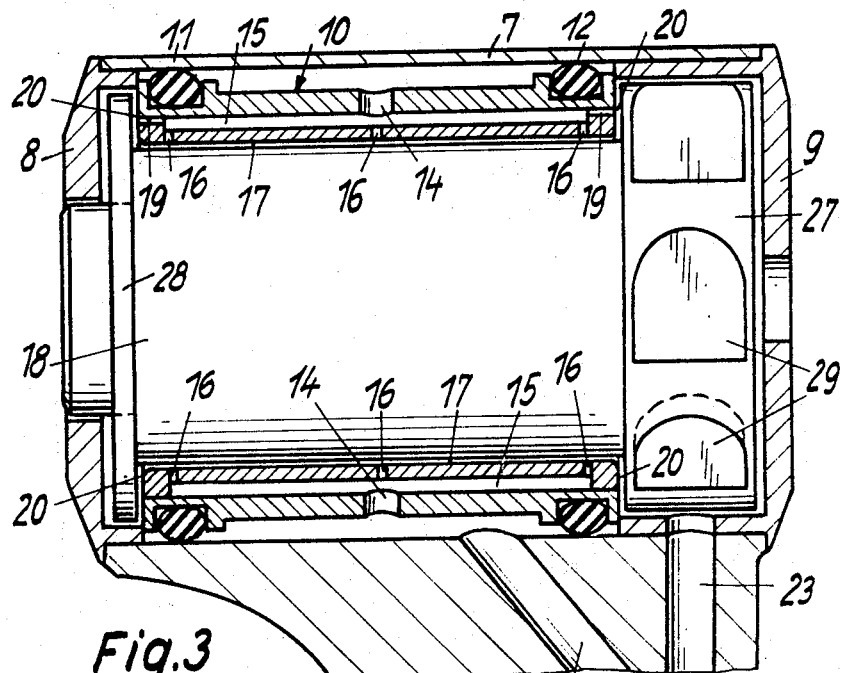
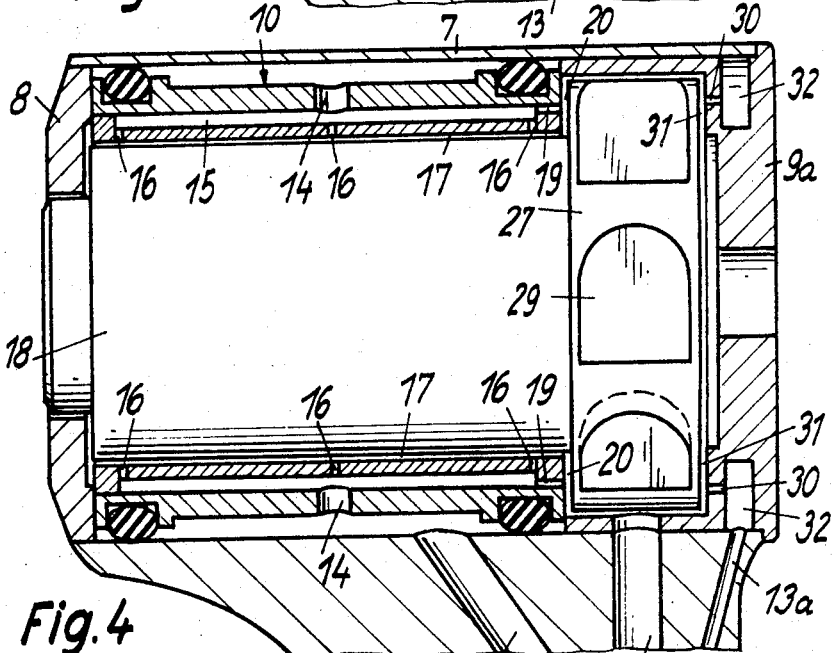

Oct. 7, 1969     H. TAUBALD ET AL     3,471,125
DENTAL HANDPIECE WITH COMPRESSED-AIR TURBINE DRIVE

Filed April 7, 1966     4 Sheets-Sheet 3

INVENTORS
Helmut Taubald
Otto Fleer

BY    *Slice & Slice*

ATTYS.

Oct. 7, 1969 H. TAUBALD ET AL 3,471,125
DENTAL HANDPIECE WITH COMPRESSED-AIR TURBINE DRIVE
Filed April 7, 1966 4 Sheets-Sheet 4

INVENTORS
Helmut Taubald
Otto Fleer
BY
ATTYS.

3,471,125
DENTAL HANDPIECE WITH COMPRESSED-AIR
TURBINE DRIVE
Helmut Taubald and Otto Fleer, Erlangen, Germany, assignors to Siemens-Reiniger-Werke Aktiengesellschaft, Erlangen, Germany, a corporation of Germany
Filed Apr. 7, 1966, Ser. No. 540,861
Claims priority, application Germany, Apr. 10, 1965, S 96,467; Mar. 29, 1966, S 10,287
Int. Cl. F01d 15/06; F03b 13/04
U.S. Cl. 253—2
3 Claims

ABSTRACT OF THE DISCLOSURE

A dental handpiece having a compresed-air turbine engine wherein, between the rotor and a single hollow cylindrical bearing bushing, there is provided a single axial bearing gap. Two radial bearing gaps are defined by parts of the end faces of the rotor and by surfaces of bearing parts lying parallel with said end faces. The single hollow cylindrical bearing bushing is fitted with at least one ring of radially extending nozzles for delivery of compressed air to the single axial bearing gap and a plurality of axially extending nozzles in the end faces of the bearing bushing for delivery of compressed air to the two radial bearing gaps.

---

The invention concerns a dental handpiece with a compressed-air turbine intended to drive a handpiece-mounted drill and other rotating tools, the rotor of the turbine being supported by compressed-air bearings.

In such a handpiece which is known from the U.S. Letters Patent 3,147,551, the cylindrical rotor surface which functions as a bearing surface is subdivided into two parts by the turbine wheel. To each of these two parts of the cylindrical rotor surfaces is allotted one of the two cylindrical bearing bushings having an inside diameter which is larger in size than the outside diameter of the rotor bearing parts by about 0.01 to 0.02 mm. In this way two axial bearing gaps are obtained. Each of the two bearing bushings is provided with at least one ring of radially extending nozzles having a diameter from 0.1 to 0.2 mm. approximately. These nozzle rings communicate with a compressed-air source from which the two axial bearing gaps receive the required compressed air necessary for supporting the rotor in the radial direction. Between the end faces, one opposing the other, of the two cylindrical bearing bushings, the turbine wheel is arranged. Each of the two end faces of the turbine wheel is 0.1 up to 0.2 mm. distant from the opposing end face of the bearing bushing. This has the effect that on each of the two sides of the turbine wheel a radial bearing gap is produced which terminates into the axial bearing gap situated on the same side of the turbine wheel. From this bearing gap each of the two radial bearing gaps receives the compressed air required for supporting the rotor in axial direction.

Such dental handpieces have been found to present difficulties caused by the radial and axial work pressure produced during the drilling operation. The compressed-air bearings described do not safely withstand this work pressure, and this is the reason why the rotor tends to touch the bearing bushing.

The object of the invention is considerably to increase the bearing capacity of the compressed-air bearings without having to rise materially the pressure of the bearing air and the turbine dimensions.

In pursuing this objective the inventors have found that with reference to the known handpieces the two bearing bushings normally fail to be in alignment owing to tolerances in their manufacture. The consequence of this is that at least one of the two bearing gaps no longer surrounds the rotor centrically but eccentrically. This leads to part of the bearing capacity being lost. The first characteristic of the invention is based on these observations of the inventors and consists in providing the air bearing of the rotor with a single axial and cylindrical bearing gap delimited on the one part by a single cylindrical surface of the rotor and on the other part by the interior surface of a single cylindrical bearing bushing and with two radial bearing gaps delimited on the one hand by parts of the rotor end faces and on the other hand by surfaces of bearing parts lying parallel to these end faces. The difficulties mentioned and caused by the known use of two bearing bushings for the radial support of the rotor are thus avoided.

Moreover, the inventors have found that with reference to the known dental handpieces which feature a built-in compressed-air turbine and compressed-air support of the rotor in two axial and two radial bearing gaps, the compressed-air support of the rotor proves to be unstable, also in axial direction, owing to the compressed-air ducted to the two radial bearing gaps from the axial bearing gaps. It is especially in the axial direction that a considerable work pressure develops during the drilling procedure. For this reason a second characteristic of the invention consists in that the cylindrical bearing bushing for the rotor is provided with at least one ring of radially extending nozzles allowing the compressed-air to be fed to the single axial bearing gap and that the bearing parts confining the two radial bearing gaps are equipped with several axially extending nozzles allowing the compressed air to be ducted to these radial bearing gaps. The radial bearing gaps, therefore, receive the compressed-air independent of the single axial bearing gap, whilst the bearing capacity can be adequately dimensioned by laying out the axially extending nozzles so as to be sufficient.

A particularly straight-forward design of the rotor bearing is ensured by a further characteristic of the invention consisting in that the two end faces of the single cylindrical bearing bushing can be utilized as the contact surfaces of the two radial bearing gaps and in that the other two contact surfaces of the two radial bearing gaps are formed by rotor surfaces lying parallel to the two end faces of the single cylindrical bearing bushing.

The contact surfaces of the two radial bearing gaps and the interior contact surfaces of the axial bearing gap are then generated surfaces of the rotor and all opposing surfaces are generated surfaces of the single cylindrical bearing bushings. In this manner a high degree of precision is obtained for the contact surfaces of all bearing gaps. As generated surfaces of the rotor, which confine the two radial bearing gaps can be utilized the inner end faces of two turbine wheels, a turbine wheel being clamped on each end of the rotor. The single cylindrical surface of the rotor extending between the two turbine wheels functions in this instance as the internal contact surface of the single axial bearing gap. In deviating from this design it would be possible for the second turbine wheel to be replaced by a ring-shaped rotor flange corresponding in diameter to the turbine wheel.

A further characteristic of the invention relates to the construction of the single cylindrical bearing bushing should it prove desirable to have several rings of radially extending nozzles distributed on the bearing in longitudinal direction. In order to ensure a uniform air pressure at all nozzle rings it is found expedient to provide inside the cylindrical bearing a cylindrical pressure-compensating duct into which terminate the rings of the radially extending nozzles and also a ring of compressed-air conduits. The simplest manner of obtaining a bearing bushing having such a cylindrical pressure-compensating duct is to provide a bearing bushing solidly made up of a first cylindrical body which at each end of its cylindrical external surface can be fitted with an annular groove for each ring of elastic material designed to support this first cylindrical body inside the housing of the handpiece, and a second cylindrical body provided with ring-shaped flanges fitted at its both end faces, the outside diameter of which being adjusted to the inside diameter of the first cylindrical body to allow both insertion into the first cylindrical body and a tight seat by means of these flanges. Part of the second cylindrical body lying between the two flanges is then at a distance from the interior surface of the first cylindrical body and this distance forms the cylindrically shaped pressure-compensating duct.

In compliance with a further characteristic of the invention the pressure-compensating duct described can be subdivided into longitudinal grooves on the interior surface of the first cylindrical body of the bearing bushing, the number of longitudinal grooves corresponding to the number of nozzles which are provided in the rings of radially extending nozzles. In this case no flanges are required at the second cylindrical body. This second body consists of a bushing whose outside diameter is so adjusted to the inside diameter of the first cylindrical body at the points unprovided with longitudinal grooves that it can be inserted into the first cylindrical body and given a tight seat.

Although the invention substantially improves the compressed-air bearing of the rotor, the rotor may rub against the interior surface of the single cylindrical bearing bushing if a very high work pressure is exerted on the rotating tools.

In order to minimize the friction between the rotor and the bearing bushing the invention also allows for the use of a bearing having its interior side lined with carbon steel, if the rotor is made of steel.

For a better understanding of the present invention and to show how the same may be carried into effect, various drawings are given to illustrate the object of invention.

FIGS. 2 through 5 show an axial longitudinal section, on an enlarged scale as compared with FIG. 1, through various practical examples of the head part of the handpiece according to FIG. 1.

Figure 1:
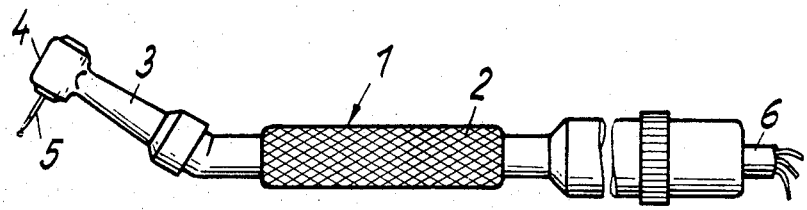
FIG. 1 is the side view of a dental handpiece with the head part containing the compressed-air turbine arranged at an angle to the longitudinal axis of the handpiece.

The dental handpiece according to FIG. 1 consists of the handle 2, the angled stem 3, the cylindrical head part 4 with clamped drill 5 and hose 6 introduced into the rear handpiece end for the supply of compressed-air and water under pressure.

Figure 2:
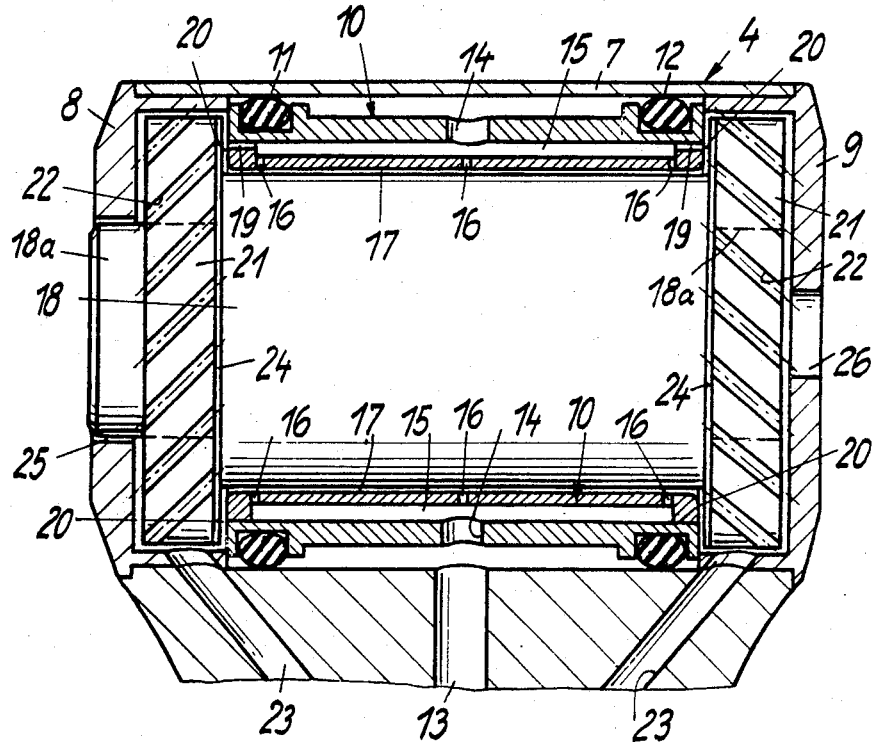

With reference to the design of the head part 4 according to FIG. 2, the compressed-air turbine proper is inserted into the cylindrical housing 7. The turbine consists of the rotor with the rotor shaft 18 and the turbine wheels 21 slipped on both shaft ends 18a, as well as of the single cylindrical bearing bushing 10. Elastic rings 11 and 12 which are fitted in annular grooves of the single cylindrical bearing bushing 10, support the compressed-air turbine against the interior wall of the cylindrical housing 7. The cylindrical housing 7 is closed at its front and rear ends by covers 8 and 9. The covers can be pressed into the cylindrical housing 7 or glued into it or secured by screw connection. Inside the single cylindrical bearing bushing 10 the rotor is supported by compressed-air bearings consisting of the single axial bearing gap 17 and the two radial bearing gaps 20. The axial bearing gap 17 is supplied with compressed-air through conduit 13 in the cylindrical head part 7 via a ring of bores 14 and three rings of radially extending nozzles 16 in the single bearing bushing 10. The two radial bearing gaps 20 are supplied with compressed-air through the axially extending nozzles 19 in the bearing bushing 10. The bearing bushing 10 consists of an external hollow cylindrical body in which a second hollow body of cylindrical shape with flanges at each of its end faces is introduced and given a tight seat, the outside diameters of the flanges being adjusted to the inside diameter of the external cylindrical body.

Between the two flanges of the interior cylindrical body and the interior wall of the external cylindrical body a ring-shaped conduit 15 is formed which ensures uniform pressure distribution over the three rings of the radially extending nozzles 16. The two turbine wheels 21 are provided on their periphery with oblique transverse grooves 22. The interior end faces of the two turbine wheels 21 are covered by the annular discs 24. The driving air is ducted to the turbine wheels through the conduits 23 in the cylindrical housing 7 and the expanded air as well as the compressed-air used for the turbine support is discharged through central openings 25 and 26 in the covers 8 and 9. All three bearing gaps are confined on the one hand by surfaces of rotor 18, 21 and on the other hand by surfaces of the single cylindrical bearing bushing 10.

In the practical example according to FIG. 3 those parts which correspond to the parts according to FIG. 2 are indicated with the same numbers. The practical example according to FIG. 3 differs from the example according to FIG. 2 only by the fact that on one side of the rotor shaft 18 a turbine wheel 27 with pocket-shaped blades 29 is arranged. On the opposite side of the rotor shaft an annular flange 28 is fitted instead of a turbine wheel. Here again the three bearing gaps are confined on the one hand by rotor 18, 27, 28 and on the other hand by the single bearing bushing 10.

In the practical example according to FIG. 4 the components which correspond to those in FIG. 2 are marked with the same numbers. Here again only at one end of the rotor shaft 18 a turbine wheel 27 with pocket-shaped blades 29 is mounted. The radial bearing gap 20 is delimited in the same way as the two radial bearing gaps in FIG. 1, both by the end face of the cylindrical bearing bushing 10 and by the interior end face of the turbine wheel. The other radial bearing gap is marked with 31 and is confined by the external end face of the turbine wheel and the inner end face of cover 9a. Cover 9a houses the annular duct 32 into which the compressed-air feeding conduit 13a in the cylindrical housing 7 merges. From this annular duct 32 a ring of axially extending nozzles 30 leads into the bearing gap 31.

Figure 5:
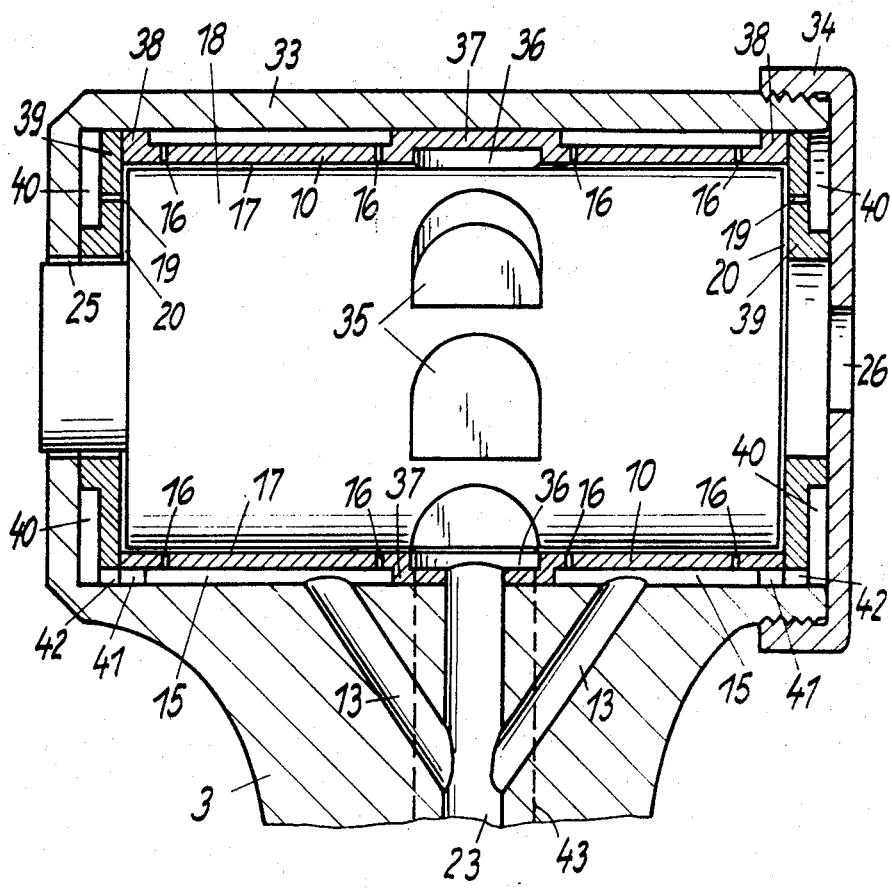

In the practical example after FIG. 5 stem 3 merges into the pot-shaped housing 33 which on the left side is fitted with the central opening 25 and which on the right side is closed by the screw cover 34 in which the central opening 26 is provided. The compressed-air turbine is composed of the rotor 18 terminating in a butt on its left end with its outer cylindrical surface being provided in its longitudinal centre with pocket-shaped depressions 35 serving as blades, as well as of the cylindrical bearing bushing 10 with an external flange part 37 in its longitudinal centre and external flanges 38 at its both ends as well as of the two bearing parts 39 fitted at both end faces. Around the blade ring 35 the cylindrical bearing bushing 10 is provided with the annular groove 36. The cylindrical bearing bushing 10 with its flange parts 37, 38 rests directly against the interior wall of the pot-shaped housing 33 and there is a space between these flange parts and the interior wall resulting in two annular conduits 15 into which each two rings of radial nozzles 16 and the compressed-air feeding conduits 13 terminate. The two annular ducts 40 situated on the outside of the bearing parts 39 at the end faces are supplied with compressed-air through conduits 41 and 42 in the flange parts 38 and in the bearing parts 39, the two ducts 40 discharging into the two radial bearing gaps 20 via the axial nozzle 19. In this practical example as well only one axial bearing gap 17 and two radial gaps 20 are provided, the axial bearing gap 17 being confined on the one hand by the cylindrical surface of rotor 18 and on the other hand by the single cylindrical bearing bushing 10 and the two radial bearing gaps being confined by the faces of rotor 18 and by the opposing surfaces of the frontal bearing parts 39, the opposing surfaces being parallel to the rotor faces. Inside the stem 3 there is a hatched conduit marked with 43 through which the expanded air is allowed to pass out into atmosphere through annular groove 36.

Figure 6:
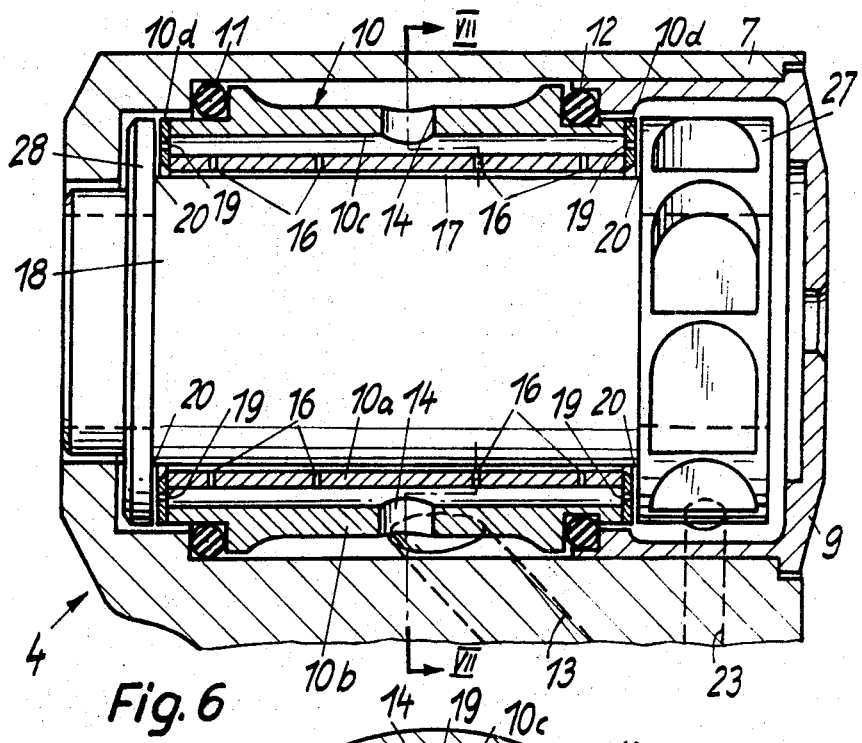
FIGS. 6 and 7 show an axial longitudinal section and a cross section taken on the line VII—VII of FIG. 6 with a special practical example of the outer cylindrical body of the bearing bushing.
Figure 7:
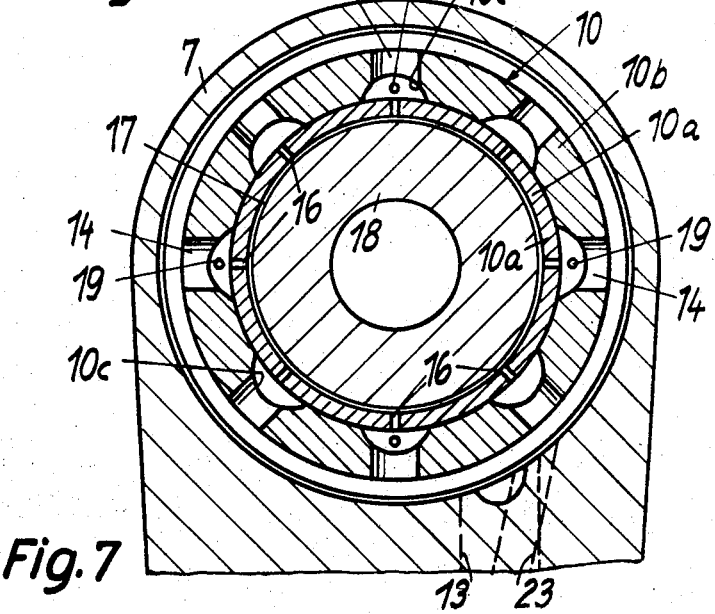

The design according to FIGS. 6 and 7 largely resembles the practical example according to FIG. 3. The hollow cylinder 7 of the angle head 4 has the rear end closed by the cover 9, whilst the front end closure is formed by a corresponding angulation of the cylinder. The cylindrical bearing bushing 10 is held radially and axially in the angle head by elastic rings 11, 12 resting in suitable angular recesses of the cylinder 7 and of cover 9 and of the bearing bushing 10. The rotor consists of the shaft 18, the turbine wheel 27 mounted on the rear end of the shaft, and the annular flange 28 secured to the tapered front end of the shaft. The design of the bearing bushing is different. The cylindrical body 10a opposing the rotor shaft 18 with the radially extending nozzle rings—each ring consists e.g. of 8 nozzles 16 (FIG. 7) uniformly distributed over the entire cylinder circumference—is made of carbon steel or similar material, whereas the external cylindrical body 10b may be made of brass. In the interior wall of the cylindrical body 10b, a longitudinal groove 10c is cut in the area of each nozzle row i.e. 8 longitudinal grooves with 8 nozzle rows (FIG. 7)—each row comprising, for example, 4 nozzles 16 (FIG. 6)—the grooves ensuring an even distribution of the compressed-air over all radially extending nozzles 16. The compressed-air is guided to the longitudinal grooves through one each radially extending bore 14. The two cylindrical bodies are so adjusted to each other that the outside diameter of the interior body 10a corresponds to the inside diameter of the external body 10b at the points not provided with longitudinal grooves 10c, which allows the carbon-steel body to be glued into the brass body. The two end faces of the bearing bushing 10 consist likewise of carbon steel and each of them has the shape of an annular disc 10d glued to the faces of the hollow cylinder made up of the parts 10a and 10b, the axial nozzles 19 having been drilled prior to this. With reference to this practical example each nozzle ring 19 consists of only 4 nozzles which are oriented to every second longitudinal groove 10c (FIG. 7) and are fed with compressed-air from this point. As in example after FIG. 3 the axially extending bearing gap 17 and the radially extending bearing gap 20 lie between the rotor parts 18, 27, 28 and the bearing bushing 10. The compressed-air is ducted to the bearings through conduit 13 and the driving air for the turbine wheel through conduit 23.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

We claim:

1. In a dental handpiece having a compressed air driven tool gripping rotor positioned in the head thereof the improvement of: said head having a variously diameter axial bore therethrough, said rotor disposed in said bore and freely supported therein by air bearing gaps, a first cylindrical member inserted in said bore in closely spaced relation to the inner diameter wall thereof, said first cylindrical member defining an air channel between the outer diameter of said first cylindrical member and the inner diameter of said bore, said air channel sealed at the axial ends thereof by annular seal means entrapped between the first cylindrical member and the inner diameter of said bore, said seal means resiliently retaining the said first cylindrical member radially and axially in said bore, a second cylindrical member positioned in said bore radially interiorly of said first cylindrical member, portions of the outer diameter of said second cylindrical member contacting portions of the inner diameter of said first cylindrical member to retain the said second cylindrical member in position radially inwardly of said first cylindrical member, air passageways through the said first cylindrical member to provide air from the circumferential air channel around the first cylindrical member to spaces between the said first and said second cylindrical members, a plurality of air ports through said second cylindrical member to supply air from the spaces between the said first and said second cylindrical members to the interior of the said second cylindrical member, said rotor positioned interiorly of the said second cylindrical member with portions thereof extending axially beyond the said second cylindrical member, the portion of said rotor positioned radially inwardly from said second cylindrical member having a smooth generated cylindrical surface providing a single air bearing gap between the said surface and the said second cylindrical member, said air ports adapted to supply air to the said single bearing gap whereby the said rotor is radially supported in closed spaced relationship to the interior diameter surface of the said second cylindrical member, the portions of said rotor extending axially beyond the said second cylindrical member having radially outwardly extending generated surfaces thereon, bearing members in close spaced relationship with said radially extending surfaces defining air bearing gaps between said surfaces and said bearing members, means for supplying compressed air from the said air channel between the interior diameter of the said bore and the said first cylindrical member to the said bearing gaps between the said bearing members and the said radially extending surfaces to retain the said rotor axially in said bore, and a turbine wheel on said rotor axially beyond the said first and said second cylindrical members with means associated therewith for supplying compressed air to the said turbine wheel to rotate the said rotor whereby the said rotor is rotatably supported in the said bore by two axial air bearing gaps and a single radial air bearing gap.

2. A dental handpiece comprising: a housing having a head portion, said head portion having a variously diameter bore therethrough, a first cylindrical member inserted in said bore, two circumferential resilient seal members entrapped between portions of the first cylindrical member and portions of the housing whereby the first cylindrical member is resiliently retained in the said bore, said seal means axially spaced apart, an air channel defined between the said seal means and the inner diameter of the said bore and the outer diameter of the said first cylindrical member, said air channel extending circumferentially around the said first cylindrical member, means for supplying compressed air to the said air channel, a plurality of longitudinal grooves in the inner diameter of the said first cylindrical member, said grooves circumferentially spaced apart by longitudinal lands, radial bores communicating the said grooves to the said air channel, a second cylindrical member positioned radially interiorly of the said first cylindrical member, the outer diameter of the said cylindrical member contacting the said longitudinal lands to seal the said grooves circumferentially one from another, the axial ends of the said first and said second cylindrical members terminating in substantially the same radial plane, bearing members closing the said grooves at the axial ends thereof, air ports extending through the said second cylindrical member to the interior diameter thereof, the said interior diameter of the said second cylindrical member comprising a smooth cylindrical surface, a tool gripping rotor positioned interiorly of the said second cylindrical member and extending axially beyond the said second cylindrical member, the portion of the said tool gripping rotor positioned radially inwardly of the said second cylindrical member comprising a smooth cylindrical generated surface in close spaced radial relationship to the said inner diameter of the said second cylindrical member whereby a single radial air bearing gap is defined between the two smooth cylindrical surfaces and compressed air supplied to the longitudinal grooves from the air channel is forced through the air ports to the said single bearing gap to radially support the said rotor interiorly of the said second cylindrical member, radially extending wall surfaces on the said rotor axially beyond the said bearing members in close spaced relationship thereto defining air bearing gaps therebetween, and air ports through the said bearing members communicating some of the said longitudinal grooves to the said bearing gaps to axially support the said rotor, a turbine wheel on said rotor axially beyond said first and second cylindrical members, and means for supplying compressed air to the said turbine wheel to rotate the said rotor, whereby the rotatable rotor is axially and radially supported with respect to the first and second cylindrical members by air bearings and the said first and second cylindrical members are resiliently retained in the said bore against radial and axial movement.

3. The dental handpiece of claim 2 where the said seal means are elastomeric O-ring seals.

References Cited

UNITED STATES PATENTS

| | | |
|---|---|---|
| 2,605,619 | 8/1952 | Serduke. |
| 3,088,707 | 5/1963 | Williams et al. _____ 253—2 |
| 3,147,551 | 9/1964 | Seegers _____ 253—2 X |
| 3,210,044 | 10/1965 | Mori _____ 253—2 |
| 3,268,205 | 8/1966 | Allen et al. _____ 253—2 |
| 3,293,955 | 12/1966 | Malmgren _____ 253—2 X |
| 3,306,375 | 2/1967 | Macks _____ 235—2 X |
| 3,310,285 | 3/1967 | Hawtin _____ 253—2 |

FOREIGN PATENTS 1,018,684   2/1966   Great Britain.

EVERETTE A. POWELL, JR., Primary Examiner